(12) United States Patent
Starobinski et al.

(10) Patent No.: US 8,763,751 B2
(45) Date of Patent: Jul. 1, 2014

(54) SILENCER FOR AN AUXILIARY POWER UNIT OF AN AIRCRAFT

(75) Inventors: Rudolf Starobinski, Hamburg (DE); Matthias Siercke, Hamburg (DE)

(73) Assignee: Airbus Operations GmbH (DE)

( * ) Notice: Subject to any disclaimer, the term of this patent is extended or adjusted under 35 U.S.C. 154(b) by 369 days.

(21) Appl. No.: 13/123,256

(22) PCT Filed: Oct. 9, 2009

(86) PCT No.: PCT/EP2009/063206
§ 371 (c)(1),
(2), (4) Date: May 25, 2011

(87) PCT Pub. No.: WO2010/040837
PCT Pub. Date: Apr. 15, 2010

(65) Prior Publication Data
US 2011/0303786 A1    Dec. 15, 2011

Related U.S. Application Data

(60) Provisional application No. 61/195,835, filed on Oct. 10, 2008, provisional application No. 61/148,328, filed on Jan. 29, 2009.

(30) Foreign Application Priority Data

Oct. 10, 2008  (DE) .......................... 10 2008 051 241
Jan. 29, 2009  (DE) .......................... 10 2009 006 579

(51) Int. Cl.
*F02K 1/00*    (2006.01)

(52) U.S. Cl.
USPC ........................... 181/213; 244/1 N; 415/119

(58) Field of Classification Search
CPC ............. F02K 1/00; F02K 1/04; F02K 1/827; B64D 33/04; B64D 2033/0206; B64D 2033/0213
USPC ......... 181/210, 211, 212, 213, 250, 266, 273, 181/276, 292; 244/1 N; 415/119; 60/770
See application file for complete search history.

(56) References Cited

U.S. PATENT DOCUMENTS 2,988,302 A *  6/1961  Smith .............................. 244/15
3,910,374 A    10/1975  Holehouse
(Continued)

FOREIGN PATENT DOCUMENTS

DE    69017042 T2    8/1995
DE    60105521 T2    10/2005
(Continued)

*Primary Examiner* — Jeremy Luks
(74) *Attorney, Agent, or Firm* — Lerner, David, Littenberg, Krumholz & Mentlik, LLP

(57) ABSTRACT

A silencer for an auxiliary power unit of an aircraft comprises an inlet, an outlet, a housing and a flow channel with a porous wall material that is arranged in the housing. An intermediate space is formed between the housing and the flow channel and divided into outer cells that are arranged around the flow channel by means of one or more partitions. This makes it possible to realize a very compact silencer with very good sound insulation properties. The sound dampening can be additionally improved by dividing the outer cells into outer regions and inner regions, by adapting the shape of the silencer to a tail section of an aircraft and by arranging an annular channel on the outlet.

19 Claims, 9 Drawing Sheets

(56) References Cited

U.S. PATENT DOCUMENTS

| | | | |
|---|---|---|---|
| 4,091,892 A * | 5/1978 | Hehmann et al. | 181/286 |
| 4,137,992 A * | 2/1979 | Herman | 181/213 |
| 4,452,335 A | 6/1984 | Mathews et al. | |
| 4,453,887 A * | 6/1984 | Schucker | 415/119 |
| 4,979,587 A * | 12/1990 | Hirt et al. | 181/213 |
| 5,162,620 A | 11/1992 | Ross et al. | |
| 6,123,170 A | 9/2000 | Porte et al. | |
| 6,308,915 B1 * | 10/2001 | Liston et al. | 244/54 |
| 6,615,576 B2 * | 9/2003 | Sheoran et al. | 60/39.5 |
| 6,772,857 B2 | 8/2004 | Porte et al. | |
| 6,935,834 B2 * | 8/2005 | Lata Perez | 415/115 |
| 2002/0050420 A1 | 5/2002 | Porte et al. | |
| 2002/0070077 A1 | 6/2002 | Porte et al. | |
| 2002/0104707 A1 | 8/2002 | Moffat et al. | |
| 2003/0141144 A1 * | 7/2003 | Wilson | 181/292 |
| 2006/0043236 A1 | 3/2006 | Campbell et al. | |
| 2006/0180388 A1 | 8/2006 | Brown et al. | |
| 2006/0207826 A1 * | 9/2006 | Williams | 181/214 |
| 2007/0214767 A1 | 9/2007 | Napier et al. | |
| 2008/0078863 A1 | 4/2008 | Lwasa et al. | |
| 2008/0236939 A1 * | 10/2008 | Napier et al. | 181/224 |
| 2009/0266642 A1 * | 10/2009 | Farstad | 181/213 |

FOREIGN PATENT DOCUMENTS

| | | |
|---|---|---|
| DE | 102004056889 A1 | 6/2006 |
| EP | 0636780 A1 | 2/1995 |
| EP | 1213703 A1 | 6/2002 |
| EP | 1398473 A1 | 3/2004 |
| EP | 1621752 A2 | 2/2006 |
| EP | 1701016 A1 | 9/2006 |
| EP | 1715158 A2 | 10/2006 |
| GB | 460148 A | 1/1937 |
| GB | 2237323 A | 5/1991 |

* cited by examiner

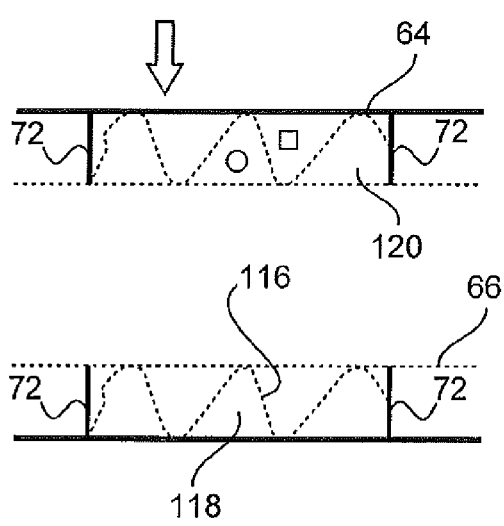
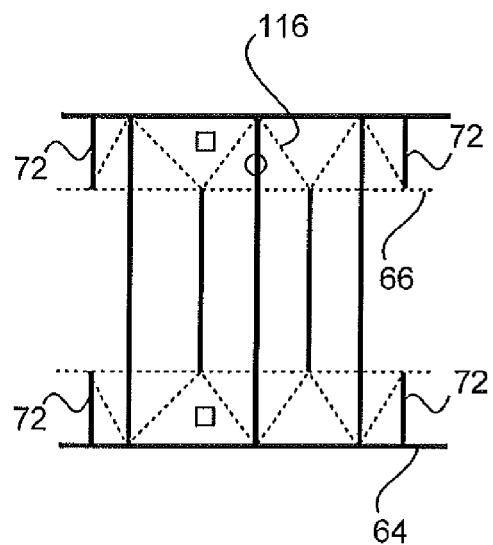
Fig.6a
Fig.6b
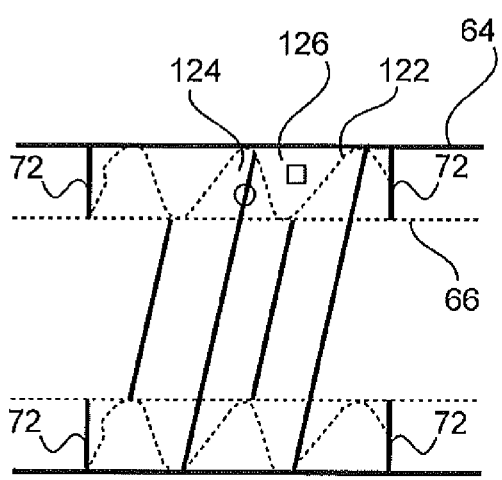
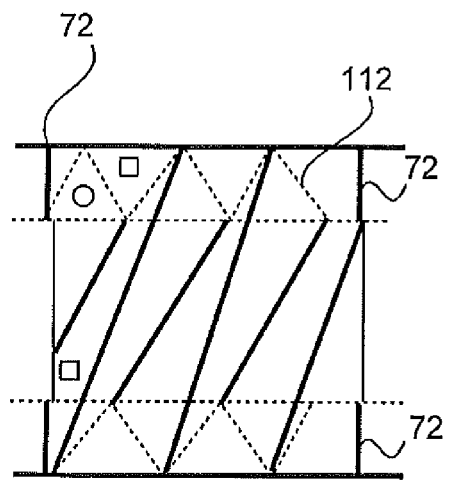
Fig.7a
Fig.7b

SILENCER FOR AN AUXILIARY POWER UNIT OF AN AIRCRAFT

CROSS-REFERENCE TO RELATED APPLICATIONS

This application is a national phase entry under 35 U.S.C. §371 of International Application No. PCT/EP2009/063206, filed Oct. 9, 2009, published in German, which claims the benefit of the filing date of German Patent Application No. 10 2008 051 241.9, filed Oct. 10, 2008, U.S. Provisional Patent Application No. 61/195,835, filed Oct. 10, 2008, German Patent Application No. 10 2009 006 579.2, filed Jan. 29, 2009, and U.S. Provisional Patent Application No. 61/148,328, filed Jan. 29, 2009, the entire disclosures of which are hereby incorporated herein by reference.

TECHNICAL FIELD OF THE INVENTION

The invention pertains to a silencer for an auxiliary power unit of an aircraft with a housing and a flow channel arranged in the housing, wherein the intermediate space between the flow channel and the housing is divided into several cells. The invention furthermore pertains to the utilization of a silencer for an auxiliary power unit in an aircraft, as well as to an aircraft with at least one auxiliary power unit and at least one silencer according to the invention.

BACKGROUND OF THE INVENTION

Commercial aircraft commonly comprise an auxiliary power unit (also referred to as "APU" for "Auxiliary Power Unit") that is frequently arranged in a tail cone of the aircraft, wherein this auxiliary power unit is designed on the basis of a turbo engine such as, for example, a turbojet engine and supplies the aircraft with compressed air and electric energy. In such an arrangement, the exhaust gas created during the operation is discharged into the surroundings of the aircraft through an exhaust gas outlet in the region of the tail cone such that none of the tail assemblies of the aircraft come in contact therewith, if possible under all conditions encountered while the aircraft is on the ground and in flight. Due to the frequent operation of the auxiliary power unit while the aircraft is on the ground, its noise emission may represent the nuisance for the airport and its surroundings. Silencers that are arranged on the exhaust gas outlet of the auxiliary power unit by means of a corresponding coupling and dampen the exhaust gas noise accordingly are used in order to reduce the noise emission on the ground.

It is known, for example, from EP 1 398 473 B1 and U.S. Pat. No. 6,772,857 B2 to reduce inflow noises on aircraft engines by means of sound-absorbing layers with a honeycomb structure and a reflector. Although a plurality of differently designed silencers for auxiliary power units are also known from the state of the art, one specific design is given special consideration below.

In this design, a flow channel is provided that connects an exhaust gas inlet to an exhaust gas outlet and is surrounded by a housing. The volume between the housing and the flow channel is divided into several cells by means of intermediate walls (also referred to as partitions), wherein the majority of the partitions is equidistantly arranged along the flow channel. The flow channel is usually composed of a metallic, felt-like material that withstands the temperature and corrosiveness of the exhaust gas and is also porous. This not only makes it possible to route the exhaust gas through the flow channel along its extension in the housing, but also allows an alternating flow transverse thereto through the wall material of the flow channel and into the individual cells such that friction converts sound energy into heat during the passage through the wall material of the flow channel and the exhaust gas noise therefore is reduced.

One problem of known silencers of this design is, for example, an insufficient ratio between the diameter of the flow channel and of the housing such that, for example, the outer diameter of the cells is relatively low by comparison and, in particular, a first occurring transversal mode of the exhaust gas sound therefore can only be weakly dampened. In addition, longer cells are required in order to considerably dampen all occurring transversal modes such that the sound damping efficiency per length unit of the silencer ultimately drops. However, there are also known silencers, in which the diameter of the housing is sufficient such that the first transversal mode can be dampened sufficiently strong, but not the second transversal mode. In broadband noise, the sound energy is predominantly transmitted in the range of resonant frequencies due to the generation of resonant modes in a silencer. Another disadvantage of these known silencers consequently can be seen in that the sound dampening is very low for certain frequency ranges due to standing waves in the silencer.

In the design of a corresponding silencer, the available installation space is very restricted, particularly in aircraft, such that the external dimensions of the silencer cannot be arbitrarily enlarged in order to increase the degree of sound dampening, but rather should always be maintained constant or at least as small as possible.

In the existing designs of silencers for auxiliary power units of an aircraft, improvements with respect to the degree of sound dampening are not readily expected without enlarging the external dimensions of the silencer.

SUMMARY OF THE INVENTION

It may therefore be the object of the invention to propose a silencer for an auxiliary power unit of an aircraft, in which improved sound dampening can be achieved without enlarging the external dimensions of the silencer. Although the silencer should be as compact as possible, it should still allow effective sound dampening in a broad frequency range.

This object is attained with a silencer for an auxiliary power unit of an aircraft according to the characteristics of independent claim 1. Advantageous additional improvements are disclosed in the dependent claims.

Exhaust gas entering the flow channel through an inlet flows toward an outlet within the flow channel and is discharged into the surroundings of the aircraft at this location. The wall material of the silencer according to the invention is porous—as it is also known from the state of the art—and allows an alternating flow through a wall of the flow channel. While flowing through the porous wall material, part of the sound energy is converted into heat such that a certain noise reduction takes place. The cells distributed along the silencer according to the invention cause this noise reduction to repeat several times such that adequate sound dampening can be achieved.

According to a first aspect of the invention, the silencer according to the invention comprises partitions that divide the silencer into several silencer cells. The cells respectively consist of an outer cell and an inner cell (28-44, 52, 74), wherein the outer cell is considered to be the partitioned region of the intermediate space between the housing and the flow channel. The inner cell (28-44, 52, 74) is the region of the flow channel that is enclosed by the outer cell. The partitions are not distributed equidistantly in the silencer according to the invention. The partitions are rather arranged relative to one another in such a way that at least two groups of cells are formed in the intermediate space between the housing and the flow channel. The outer cells of a first group respectively have a length comprised of a first interval and cells of a second group respectively have a length comprised of a second interval, wherein the first and the second interval are adjacent to one another and respectively have a width that essentially corresponds to 0.1-times the hydraulic diameter of the flow channel (6). Consequently, the individual cells differ from one another in such a way that they are suitable for effectively dampening at least the first two or three transversal modes.

Since the partitions do not equidistantly divide the silencer, it is also possible to better take into consideration a propagation of the auxiliary power unit noise with different transversal distribution and with different angles of corresponding velocity vectors. The cells of the individual groups may be arranged in an alternating sequence. The volumetric ratio between the inner and the outer cells in combination with the different cell lengths makes it possible to achieve a higher sound damping efficiency per length unit for broadband noise of an auxiliary power unit of an aircraft.

Several outer cells of the aforementioned dimensional intervals are preferably arranged along the silencer in an alternating, grouped or heterogeneously mixed sequence. The definition of the individual advantageous dimensions as a function of the hydraulic diameter is particularly sensible because the cross sections of the individual components of the silencer according to the invention do not necessarily have to be realized circular or circular over the entire length of the silencer according to the invention. In fact, this definition is also suitable for oval or sectionally flattened silencers.

According to a second aspect of the invention, it is advantageous to realize the silencer according to the invention such that the volumes of the outer cells essentially correspond to 1.0- to 1.2-times the volumes of the corresponding inner cells. Consequently, the porous wall of the flow channel is arranged in a region, in which the radial velocities of at least the first two transversal modes are relatively high, such that not just one of the at least first and second transversal modes can be dampened. This makes it possible to reduce the cell length and therefore the overall length of the silencer according to the invention.

According to an advantageous additional improvement, at least one of the outer cells is divided into an outer region and an inner region by means of an additional porous absorber layer in a cylindrical section of the housing of the silencer according to the invention, namely such that the outer region of the at least one outer cell does not directly communicate with the flow channel via its porous wall material. However, the outer region of the corresponding outer cell is connected to the inner region of the outer cell via the absorber layer, wherein the inner region is connected to the flow channel via the porous wall material of the flow channel. Accordingly, a communication between [the flow channel and] the outer region of the corresponding outer cell is only possible through its inner region via the porous absorber layer and the porous wall of the flow channel. Consequently, sympathetic vibrations are suppressed when air is pressed from the inner region into the outer region of the corresponding outer cell through the absorber layer.

The integration of another porous absorber layer for additionally dividing the outer cells makes it possible to achieve a much more advantageous volumetric ratio between the outer cells and the inner cells, wherein the term inner cells refers to the regions within the flow channel that are respectively enclosed by an outer cell. Due to the improved volumetric ratio and the simultaneously enhanced suppression of sympathetic vibrations, sound dampening superior to that known so far can be achieved with the silencer according to the invention in the same or even a smaller installation space.

In a particularly advantageous additional improvement of the silencer according to the invention, at least two outer cells that are arranged in a cylindrical section of the housing and designed in this way have a length that corresponds to 0.2- to 0.6-times the hydraulic diameter of the flow channel.

It is likewise advantageous that these outer cells respectively have a height that corresponds to 0.3- to 0.45-times the hydraulic diameter of the flow channel. Due to this measure, sympathetic vibrations are additionally suppressed and the degree of sound dampening of the silencer according to the invention is additionally improved.

In another advantageous additional improvement of the silencer according to the invention, the absorber layer is designed for forming helical outer and inner regions.

In an equally advantageous additional improvement of the silencer according to the invention, the absorber layer could be realized in the form of a circular or elliptical cylinder such that the outer regions of the outer cells annularly extend around or adjacent to the inner regions of the outer cells. The absorber layer could alternatively also have a conical shape.

In order to further enhance be advantageous sound-absorbing properties of the silencer according to the invention, the sum of the volumes of all outer regions of an outer cell corresponds to 0.8- to 1.2-times the sum of the volumes of all inner regions of an outer cell.

With respect to improved sound dampening, it is furthermore advantageous that the respective length of the cells of the first group essentially corresponds to 0.3- to 0.4-times the hydraulic diameter of the flow channel.

In an advantageous additional improvement of the silencer according to the invention, the respective length of the cells of the second group advantageously corresponds to 0.4- to 0.5-times the hydraulic diameter.

It would furthermore be conceivable to provide cells that respectively have a length corresponding to 0.2- to 0.3-times the hydraulic diameter. Other groups with different length intervals could conceivably also be provided.

In another advantageous additional improvement of the silencer according to the invention, the flow channel is dimensioned such that the radial velocity components of at least a first and a second transversal mode created in the silencer have a common maximum in the region of the wall of the flow channel. Significantly improved sound dampening is achieved due to this measure.

If the exhaust gas noise of the auxiliary power unit also has high-frequency noise components, it is advantageous to integrate at least one additional cell into the silencer, in which the outer cell has a volume that corresponds to 0.75- to 0.85-times the volume of the inner cell. Due to this measure, the position of the wall of the flow channel is adapted to the radial velocity distribution of the high-frequency noise such that the most effective dampening possible of several transversal modes can also take place at this location.

The wall material of the flow channel is advantageously realized similar to the customary state of the art, i.e., it consists of a metallic felt or a similar heat-resistant, corrosion-resistant and porous material. In this case, the flow resistance of this wall material advantageously should be realized such that it amounts to 0.8- to 1.2-times the basic resistance that, depending on the temperature, amounts to $$R = 410 \cdot \left(\frac{293}{T}\right)^{1.26} \frac{\text{Pa}}{\frac{\text{m}}{\text{s}}}$$

In this case, T is the absolute temperature of the exhaust gas that is indicated in K (Kelvin).

The resistance is generally realized such that the exhaust gas can flow through in a noise-induced fashion and the sound energy is at least in part converted into heat. However, this also means that the resistance needs to be sufficiently high for converting as much sound energy as possible into heat.

It is furthermore particularly advantageous if the housing has in at least one section a conical shape and/or comprises several conical components such that an improved adaptation to the available installation space within the aircraft tail cone can be achieved.

It is furthermore preferred that the partitions comprise drainage holes. These drainage holes preferably are respectively arranged at the lowest point of the partitions and ensure that no fuel or the like can accumulate within the individual cells. If they have a sufficiently small size, the drainage holes are not considered to be acoustically disturbing.

According to an advantageous additional improvement of the silencer according to the invention, the housing and the flow channel are adapted to a tail section of the aircraft in the form of an elongated component in order to improve the installation.

In this additional improvement, the cross section of a rear region of the flow channel and of the housing that surrounds this region of the flow channel continuously changes from a first shape to a second shape, wherein each point in the first cross-sectional shape of the flow channel is spaced apart from a nearest outer contour point by a distance that corresponds to no more than half the hydraulic diameter of the first shape, and wherein each point in the second cross-sectional shape of the flow channel is spaced apart from a nearest outer contour point by a distance that corresponds to no more than one-fourth the hydraulic diameter of the first shape.

This could be realized, e.g., in the form of a fishtail that is flattened and widened toward the outlet end.

Honeycomb materials that form the sound-absorbing lining could be at least partially utilized between the flow channel and the housing in this region of the elongated component.

The cross-sectional areas of the first shape and the second shape are preferably identical, wherein the shape of the cross sections could be realized oval, essentially rectangular or otherwise. In an equally advantageous additional improvement of the silencer according to the invention, the cross-sectional area of the second shape could be smaller than the cross-sectional area of the first shape. Due to this measure, the radial modes of the propagating high-frequency sound waves are deformed and the distance between their vibration node lines is approximately cut in half. Thusly deformed modes cannot propagate into the region of the silencer with the second shape that points toward the outlet and are reflected back into the upstream region with the first shape.

In addition, vibration modes with a smaller number of vibration node lines are dampened better in the downstream region with the narrower second shape because the centers of the noise fields lie closer to the sound-absorbing wall that is formed by the housing, any honeycomb elements and the flow channel.

In another advantageous embodiment of the silencer according to the invention, an intermediate region is situated between the upstream region with the first shape and the downstream region with the second shape, wherein a transition from the first shape to a rectangular cross section and subsequently to the second shape is realized in said intermediate region by means of plane wall surfaces.

It would furthermore be advantageous to turn the main axes of the first shape and the second shape relative to one another such that a better adaptation to the geometry of the aircraft tail section can be realized.

The above-described characteristics pertaining to an advantageous design of an end region of a silencer are generally not limited to cylindrically shaped flow channels and housings of silencers according to the invention, wherein any other round or rectangular cross-sectional shapes could also be provided.

In an advantageous additional improvement of the silencer according to the invention, the outlet of the silencer according to the invention is elongated. An additional annular channel is arranged on the outlet and connected to the outlet channel via at least one opening. The ring channel preferably comprises a plurality of exactly 8 openings that are distributed over the ring channel.

The actual purpose of this ring channel consists of significantly dampening a natural vibration that propagates outward in the outlet in an undisturbed fashion in a first radial mode, namely by inducing vibrations that cancel one another out by means of the openings. A sound wave that enters the annular channel through one of these openings can extend in the ring channel and reach an adjacent opening. When reaching this adjacent opening, the present sound waves already have traveled a certain distance such that the sound waves arriving at the adjacent openings could have an opposite phase referred to the sound waves that extend into the ring channel through the adjacent opening. Consequently, sound wave crests encounter sound wave troughs and cancel one another out with respect to their effect.

This ultimately leads to phases and opposite phases canceling one another out on all openings of the annular channel such that a significant dampening of the natural vibration takes place in the first radial mode. A few known silencers have a resonance window of sorts that is caused by the resonance of longitudinal-radial modes in the outlet within a certain range of the critical frequency of the first radial natural mode. In other words, this means that a frequency band exists, in which the acoustic transmissivity is high and hardly any dampening takes place. The additional ring channel can eliminate or at least diminish this disadvantage. Sympathetic vibrations of the air or the exhaust gas in the outlet are suppressed due to the interference of the resonance noise field within the outlet with noise propagating within the ring channel and the absorption of the acoustic energy within the ring channel.

The ring channel preferably comprises 8 openings that are arranged on an inner circumference of the ring channel such that they are uniformly spaced apart from one another. The openings, if suitably designed, are preferably spaced apart from one another in such a way that the distance between two adjacent openings to be traveled by the sound waves corresponds to a half-wave, i.e., the distance between a phase and an opposite phase. When using a different number of openings within the annular channel, it would also be possible that pairs of openings after the next or pairs of openings that lie farther apart from one another respectively form a phase and an opposite phase. The invention is not limited to embodiments, in which only the sound waves of two directly adjacent openings cancel one another out.

It is furthermore preferred that the openings of the ring channel are covered with a permeable absorption material such that part of the sound energy can already be converted into heat when the sound waves pass through the absorption material due to the resistance of the absorption material.

According to a preferred additional improvement of the silencer according to the invention, the absorption material in the annular channel has an admittance Y that essentially corresponds to the following formula:

$$Y = [0, 5 \ldots 1, 5] \cdot \left(\frac{A_N}{\rho \cdot c}\right)$$

In this case, $\rho$ is the atmospheric density, c is the speed of sound, $A_N$ is the normal cross-sectional area of the annular channel and the expression "$\rho \cdot c$" is the impedance of the exhaust gas.

According to another advantageous additional improvement of the silencer according to the invention, the annular channel is open on an inner circumference, i.e., on the surface that is directed toward the center of the annular channel, wherein this inner circumference is placed on the outlet of the silencer. The individual openings that connect the annular channel to the outlet therefore are only produced in the outlet itself such that the production costs for manufacturing the annular channel are lowered and its weight is reduced due to a smaller material quantity.

The annular channel is preferably arranged in a central region of the outlet, i.e., between the silencer end and an open end of the outlet, and neither lies flush on the silencer end nor on the open end of the outlet.

The annular channel ultimately may have any normal cross section, wherein the term normal cross section refers to an area that rotates about a center of the annular channel and thusly describes the annular channel. This normal cross section may be rectangular, triangular, cylindrical, conical, arbitrarily curved or realized in other ways. The object of the invention is not limited to any normal cross-sectional shape of the annular channel.

The object of the invention is furthermore attained with an aircraft with at least one auxiliary power unit and at least one silencer according to the invention according to the characteristics of the other independent claim.

BRIEF DESCRIPTION OF THE DRAWINGS

Other characteristics, advantages and possible applications of the present invention result from the following description of exemplary embodiments and the figures. In this respect, all described and/or graphically illustrated characteristics form the object of the invention individually and in arbitrary combinations, namely regardless of their combination in the individual claims or their references to other claims. In the figures, identical or similar objects are furthermore identified by the same reference symbols.

FIGS. 6a and 6b respectively show other differently shaped absorber layers in the form of a silencer detail.

FIGS. 7a and 7b also respectively show other differently shaped absorber layers in the form of a silencer detail.

DETAILED DESCRIPTION OF EXEMPLARY EMBODIMENTS

Figure 1:
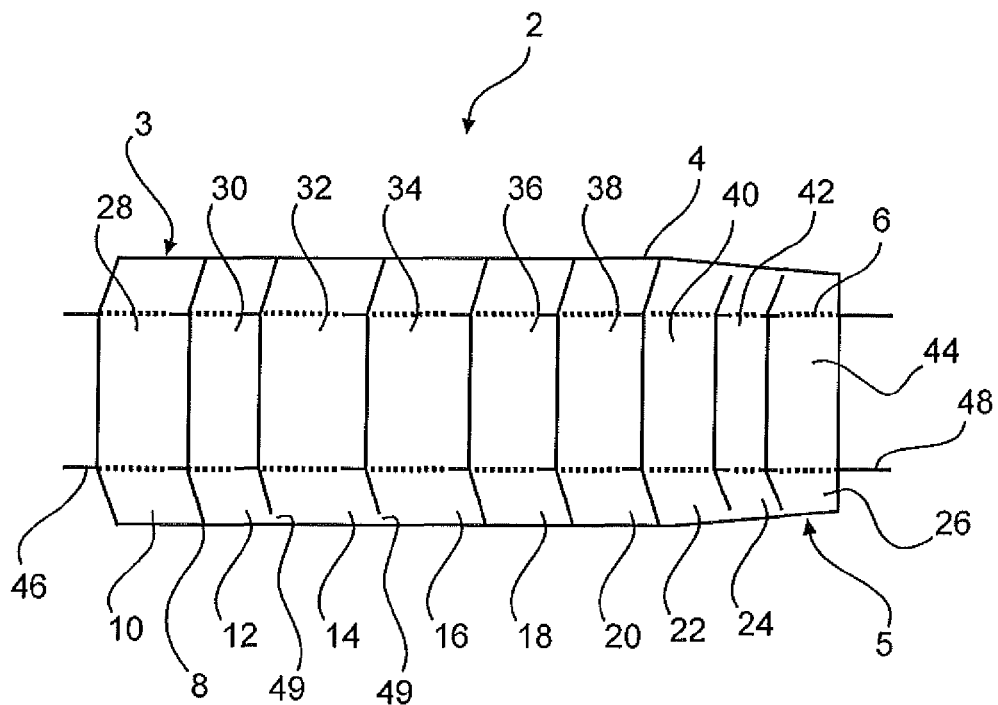
FIG. 1 shows a schematic representation of an silencer according to the invention.

FIG. 1 shows a silencer 2 according to the invention that comprises a housing 4 with one or more exemplarily cylindrical components 3 and an exemplarily illustrated conical component 5, as well as a flow channel 6 that is arranged in the housing 4. Several partitions 8 are positioned between the flow channel 6 and the housing 4 and arranged obliquely referred to the flow channel 6, as well as the housing 4. The flow channel 6 is loosely supported in corresponding openings of the partitions 8. The arrangement of the partitions 8 allows an improved thermal expansibility of the partitions 8 and the silencer 2 according to the invention in general. If the partitions 8 would merely be realized in the form of disk-shaped elements that are arranged perpendicular to the flow channel 6 and to the housing 4, the flow channel 6, as well as the housing 4, could possibly be destroyed when hot exhaust gas correspondingly acts upon the silencer 2 according to the invention.

Along the extension of the silencer 2 according to the invention, the partitions 8 form several outer cells 10 to 26 that respectively enclose an inner cell 28 to 44.

Hot exhaust gas enters the silencer 2 according to the invention through an inlet 46, successively flows through the individual inner cells 28 to 44 and once again exits the silencer 2 according to the invention through an outlet 48. During this process, sympathetic vibrations with several transversal modes that have velocity vectors extending obliquely referred to the direction, in which the silencer 2 according to the invention extends, are incited in the silencer 2 according to the invention and result in an alternating flow through the porous wall material of the flow channel 6. Due to the transverse flow into the individual outer cells 10 to 26, during which the predetermined flow resistance of the wall material of the flow channel 6 is overcome, part of the sound energy is converted into heat such that the exhaust gas noise is reduced. The most broadband reduction possible of the exhaust gas noise is achieved due to the differently adapted distances of the individual partitions 8 from one another and the resulting different volumes of the inner cells 28 to 44 and the outer cells 10 to 26.

In order to prevent fuel from accumulating in the outer cells 10 to 26, some or all partitions comprise one or more drainage holes 49 that are advantageously located at the respectively lowest point of the partitions 8.

Figure 2A:
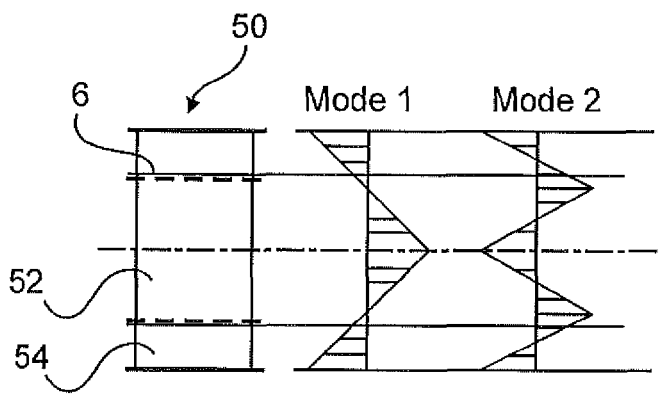
FIGS. 2a+b show sound pressure and velocity distributions in a cell of the silencer according to the invention.
Figure 2B:
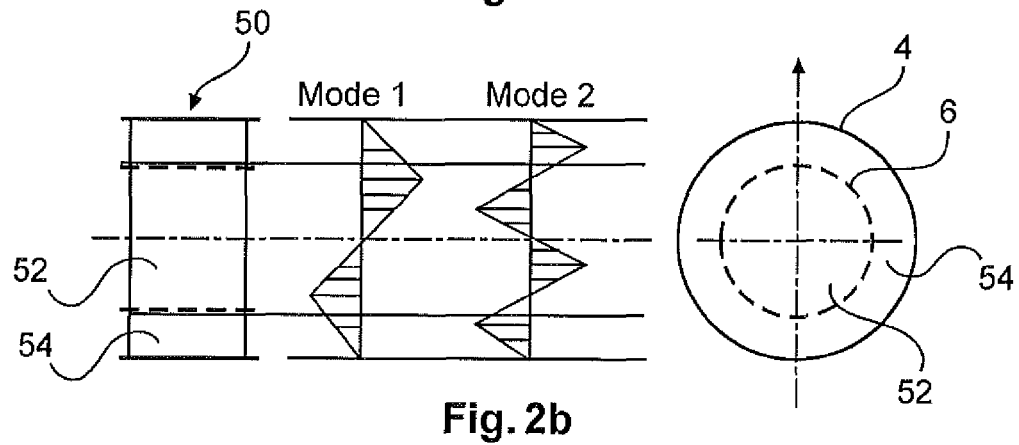

FIG. 2*a* shows the sound pressure distribution of the exhaust gas as a function of the radius r in an exemplarily illustrated individual cell 50 with an inner cell 52 and an outer cell 54. In the cell 50, the broken line between the inner cell 52 and the outer cell 54 represents part of the wall of the flow channel 6. FIG. 2*b* shows the radial velocity distribution as a function of the radius r in the same cell 50.

This illustration indicates that it is necessary to dimension the flow channel 6 in such a way that a particularly high radial velocity is achieved on its wall surface, if possible in all occurring transversal modes, in order to realize the best dissipation possible through the wall surface. FIG. 2*b* shows that the dimensions of the flow channel 6 chosen in this illustration are close to optimal because a relatively high radial velocity exists in transversal mode 1 (identified as "Mode 1"), as well as in transversal mode 2 (identified as "Mode 2"). Due to this measure, at least the first two transversal modes are optimally taken into consideration.

The resistance of the porous wall surface of the flow channel 6 that is permeable to an alternating flow needs to be realized such that a pronounced alternating flow preferably takes place between the inner cell 52 and the outer cell 54, but the flow resistance should also be so high that friction converts as much sound energy as possible into heat. One potentially advantageous realization of the flow resistance that can be individually adjusted with the material selection, the dimensions of the wall thickness and the like is described in greater detail above in the introduction to the description.

Figure 3:
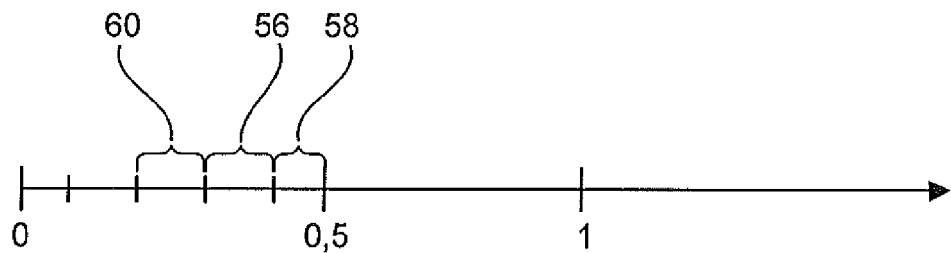
FIG. 3 shows a schematic representation of the length intervals of the cells.

A number line that is exemplarily illustrated in FIG. 3 elucidates how advantageous lengths of the outer cells 10 to 26 and the inner cells 28 to 44 can be determined. The number line shows multiples of the hydraulic diameter of the flow channel 6 with an exemplarily marked first interval 56 of a first group, a second interval 58 of a second group and a third interval 60 of a third group of outer cells 10 to 26. In the context of the present invention, it would also be possible, if applicable, to use different length intervals for outer cells 10 to 26 and correspondingly shifted boundaries without having to forgo the advantages attained with the invention. The illustration in FIG. 3 merely serves for elucidating the invention with reference to one selected example.

Figure 4:
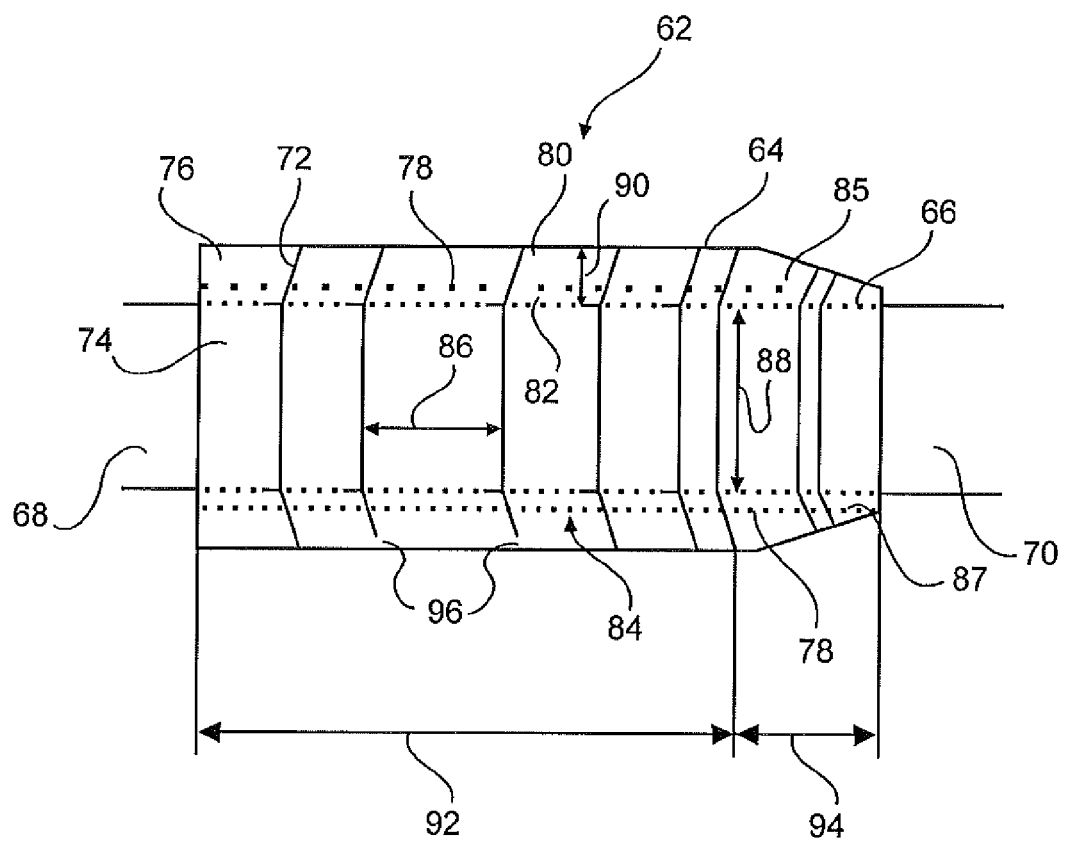
FIG. 4 shows a schematic representation of another exemplary embodiment of an silencer according to the invention.

FIG. 4 shows a silencer 62 according to the invention that comprises a housing 64 and a flow channel 66 arranged in the housing 64. The flow channel 66 extends from an inlet 68 to an outlet 10 and is made of a porous material. This material of the flow channel 6 could consist, for example, of a metallic felt or a similar material that is realized in a porous or otherwise air-permeable fashion and also maintains its mechanical integrity when it is subjected to high exhaust gas temperatures.

An intermediate space formed between the flow channel 66 and the housing 64 is divided in the longitudinal direction of the silencer 62 according to the invention by means of partitions 72. Each partition 72 forms a pair of adjacent cells that respectively consist of an inner cell 74 and an outer cell 76. In this context, an inner cell 74 is a section of the flow channel 66 that is completely enclosed by an outer cell 76 formed by a partition 12.

One peculiarity of the present silencer 62 is that the outer cells 76 are additionally divided by means of another porous absorber layer 78 such that each outer cell 76 has an outer region 80 and an inner region 82. In this case, the outer region 80 is fluidically not directly connected to the corresponding inner cell 74, but rather can only communicate with the inner region 82 via the porous absorber layer 78. Due to the porous design of the flow channel 66, however, each inner region 82 is able to communicate with the flow channel 66.

Such a design of the silencer 62 according to the invention with an additional porous absorber layer 78 makes it possible to suppress or entirely eliminate sympathetic vibrations induced by the exhaust gas jet passing through the flow channel 66.

In the illustrated example, at least two first outer cells 76 and 84 have a length that corresponds to 0.2- to 0.6-times the hydraulic diameter 88 of the flow channel 66. In addition, these at least two first outer cells 76 and 84 have a height 90 that corresponds to 0.3- to 0.45-times the hydraulic diameter 88 of the flow channel 66. It would furthermore be possible to realize outer cells 85 and 87 that do not necessarily have to entirely comply with this geometric definition.

With respect to the dimensions of the flow channel 6, the description refers to a hydraulic diameter 28 because it is not absolutely imperative that the silencer 2 and/or the flow channel 6 have/has a circular cross section. In fluid dynamics, however, it is common practice to define a hydraulic diameter for arbitrary cross-sectional shapes of objects, through which a fluid can flow, wherein this hydraulic diameter makes it possible to compare the fluidic properties of said objects.

Another peculiarity of the silencer 62 according to the invention according to FIG. 4 is the fact that a first section 92 of the silencer 62 is realized cylindrically while another region 94 of the silencer 2 according to the invention has a conical shape. Due to this measure, a better adaptation to the boundary conditions of the installation space can be achieved.

In the illustrated example, the partitions 68 are arranged obliquely such that an improved thermal expansibility of the partitions 68 and the entire silencer 62 according to the invention is achieved. If the partitions 68 would merely be realized in the form of disk-shaped elements that are arranged perpendicular to the flow channel 66 and to the housing 64, the flow channel 66, as well as the housing 64, could possibly be destroyed when hot exhaust gas correspondingly acts upon the silencer 62 according to the invention.

The partitions 68 also have the function of holding the flow channel 66 that preferably is loosely arranged in corresponding openings of the partitions 68.

The functional principle of the illustrated silencer 62 can basically be described as follows. Hot exhaust gas enters the silencer 62 according to the invention through an inlet 68, successively flows through the individual inner cells 74 and once again exits the silencer 62 according to the invention through an outlet 70. During this process, sympathetic vibrations with several transversal modes that have velocity vectors extending obliquely referred to the direction, in which the silencer 62 according to the invention extends, are incited in the silencer 62 according to the invention and result in an alternating flow through the porous wall material of the flow channel 66. Due to the transverse flow into the individual outer cells 76, part of the sound energy is converted into heat such that the exhaust gas noise is reduced. Within the outer cells 76, the exhaust gas also flows through the porous absorber layer 78, by means of which the corresponding sympathetic vibration is dampened and another part of the sound energy is absorbed and converted into heat.

The most broadband reduction possible of the exhaust gas noise can be achieved due to the differently adapted distances of the individual partitions 72 from one another and the resulting different volumes of the inner cells 74 and the outer cells 76. Likewise, the entire arrangement of the silencer according to the invention is also able to significantly dampen not only high-frequency noises, but also low-frequency noises, wherein this is achieved with a relatively high volumetric ratio between the outer cells and the inner cells.

In order to prevent fuel from accumulating in the outer cells 76, some or all partitions 72 comprise one or more drainage holes 96 that are advantageously located, in particular, at the respectively lowest point of the partitions 72 in order to improve the drainage.

Figure 5A:
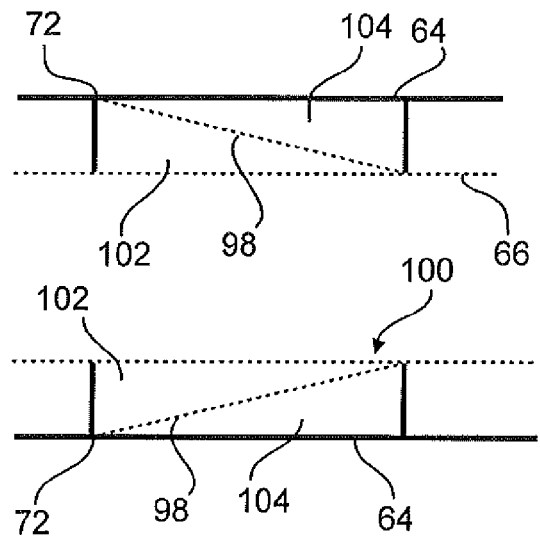
FIGS. 5a to 5c respectively show differently shaped absorber layers in the outer cells in the form of a silencer detail.
Figure 5B:
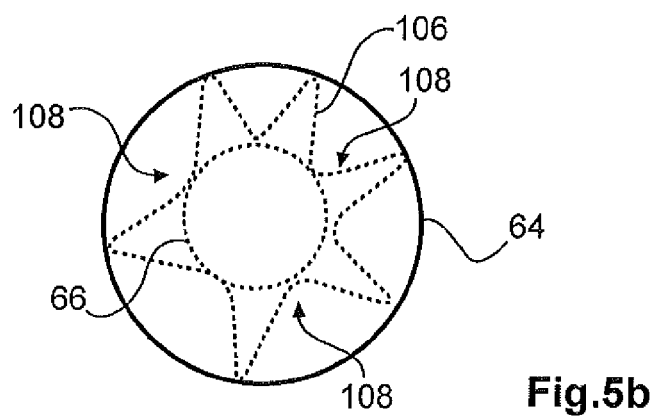
Figure 5C:
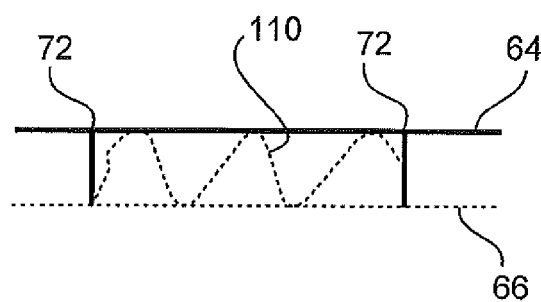
Figure 5C:
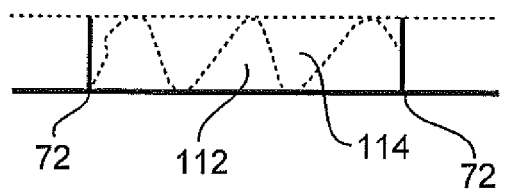

The different exemplary embodiments in FIGS. 5a to 5c, as well as in FIGS. 6a, 6b, 7a and 7b, indicate that the concrete design and configuration of the porous absorber layer 78 can be realized in many different ways.

In FIG. 5a, the porous absorber layer 98 conically extends between the housing 64 and the flow channel 66 such that the outer cell 100 is divided into an inner region 42 and an outer region 104. The outer region 104 of the outer cell 100 cannot directly communicate with the flow channel 66, but rather only with the corresponding inner region 102 of the outer cell 100 via the porous absorber layer 98.

The absorber layer 106 in FIG. 5b, in contrast, has a completely different shape than that illustrated in FIG. 5a. In this case, the absorber layer 106 forms partially cylindrical sections 108 that extend from the wall of the flow channel 66 to the housing 64 parallel to the direction, in which the silencer 62 according to the invention extends. In this context, it should be noted that cylindrical does not necessarily refer to the shape of a circular cylinder, but also, for example, to the shape of an elliptical cylinder.

FIG. 5c, in contrast, shows an absorber layer 110 that forms annular outer regions 112 and annular inner regions 114 between the housing 64 and the wall of the flow channel 66. The concrete design can be realized in numerous different ways such that the absorber layer 110 could be realized with an undulated, angular or similar shape in a longitudinal section through the silencer 62.

The exemplary embodiment according to FIGS. 6a and 6b shows an absorber layer 116 that forms annular outer regions 118 and annular inner regions 120 in the intermediate space between the flow channel 66 and the housing 64. The illustration according to FIG. 6b represents a view of FIG. 6a from the direction indicated therein with an arrow. In order to identify the configuration of the inner regions 120 and the outer regions 118, squares and circles that respectively represent the inner region 120 (circle) or the outer region 118 (square) are drawn into the respective illustration.

FIGS. 7a and 7b show an absorber layer 122 that is essentially realized similar to the absorber layer 116 according to FIGS. 6a and 6b, but the inner regions 124 and the outer regions 126 have a helical or screw-like shape in the intermediate space between the flow channel 66 and the housing 4.

Figure 8A:
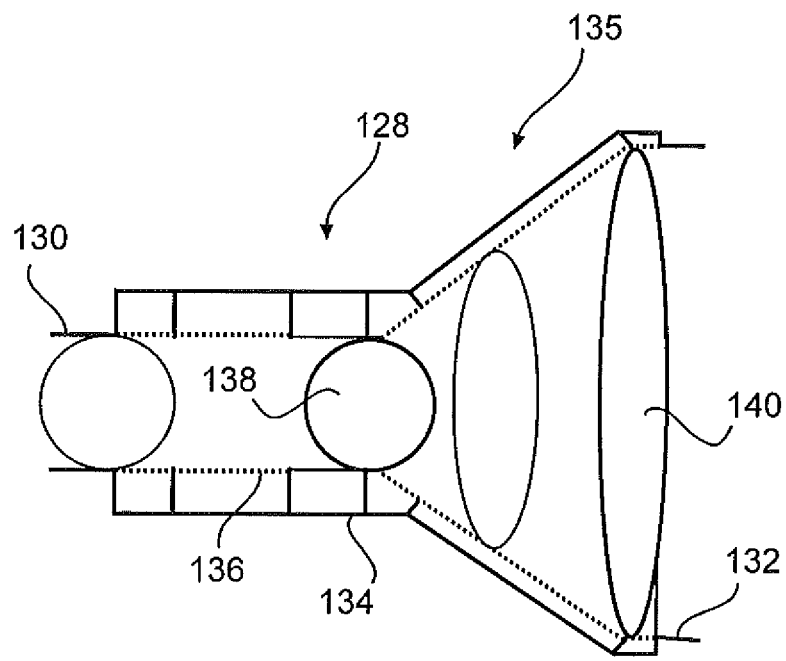
FIGS. 8a and 8b show another exemplary embodiment of the silencer according to the invention.
Figure 8B:
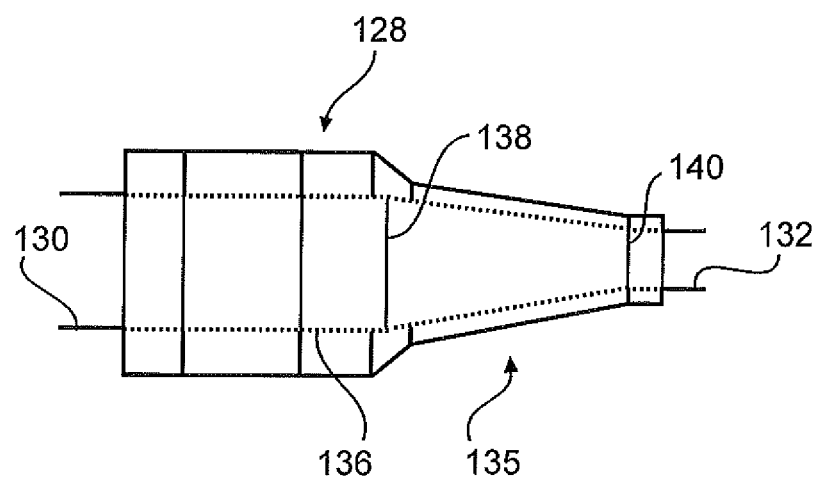

The silencer 128 according to the invention illustrated in FIGS. 8a and 8b comprises an inlet 130, an outlet 132 and a housing 134, in which a flow channel 136 is arranged. The cross section of the end of the flow channel 136 that is connected to the outlet 132 and of the corresponding section of the housing 134 continuously transforms from a first shape 138 into a second shape 140, wherein each point in the first cross-sectional shape 138 of the flow channel 136 is spaced apart from a nearest outer contour point of the housing 134 by a distance that corresponds to no more than half the hydraulic diameter of the first shape 138 of the flow channel 136, and wherein each point in the second cross-sectional shape of the flow channel 136 is spaced apart from a nearest outer contour point of the housing 134 by a distance that corresponds to no more than one-fourth the hydraulic diameter of the first shape 138 of the flow channel 136. This region could be realized in the form of an elongated component 135. A honeycomb material that improves the sound dampening could be arranged between the housing 134 and the flow channel 136 of the elongated component 135.

According to the top view of the silencer 128 according to the invention illustrated in FIG. 8b, the width 142 of the elongated component 135 could decrease continuously or in stages. The section of the silencer 128 according to the invention that points toward the outlet 132, i.e., downstream, therefore has the approximate shape of a fishtail.

Figure 9:
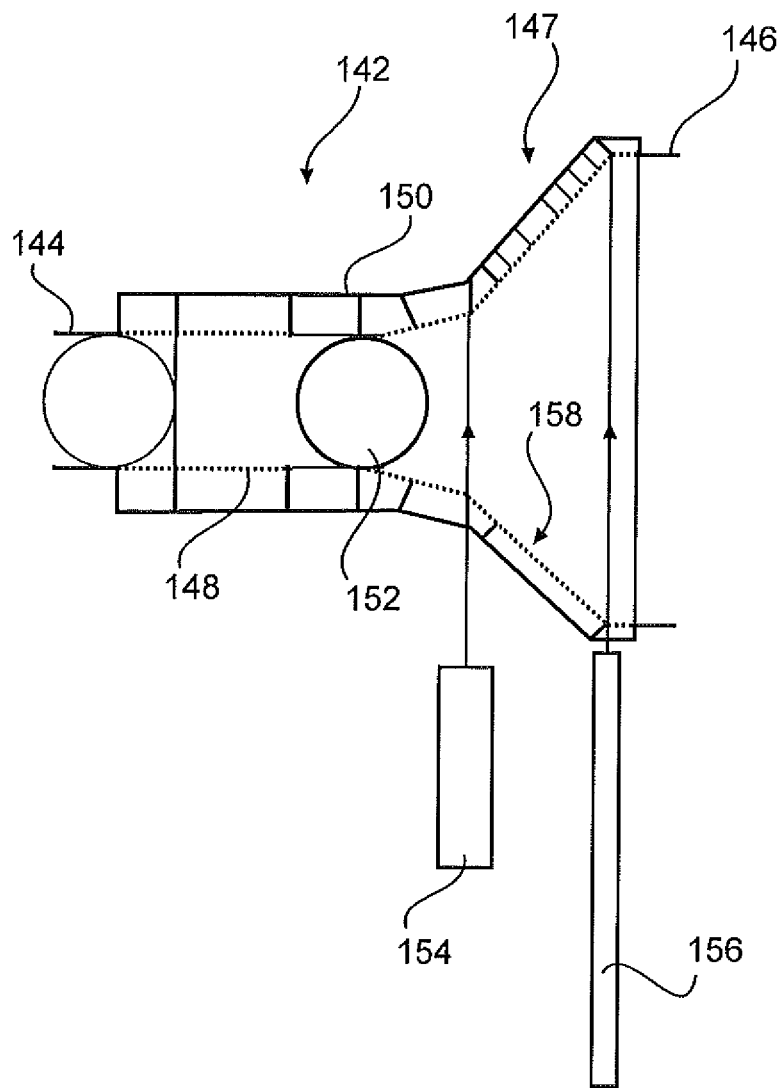
FIG. 9 shows another exemplary embodiment of the silencer according to the invention.

FIG. 9 shows another exemplary embodiment 142 of a silencer according to the invention that comprises an inlet 144 and an outlet 146, between which a flow channel 148 extends. The cross section of the flow channel in the region of the outlet 146, e.g., in the form of an elongated component 147, as well as the cross section of the housing 150 that surrounds this region of the flow channel 148, also changes continuously from a first shape 152 into a second shape 154 in order to ultimately assume a third shape 156 in the region of the outlet 146.

Figure 10:
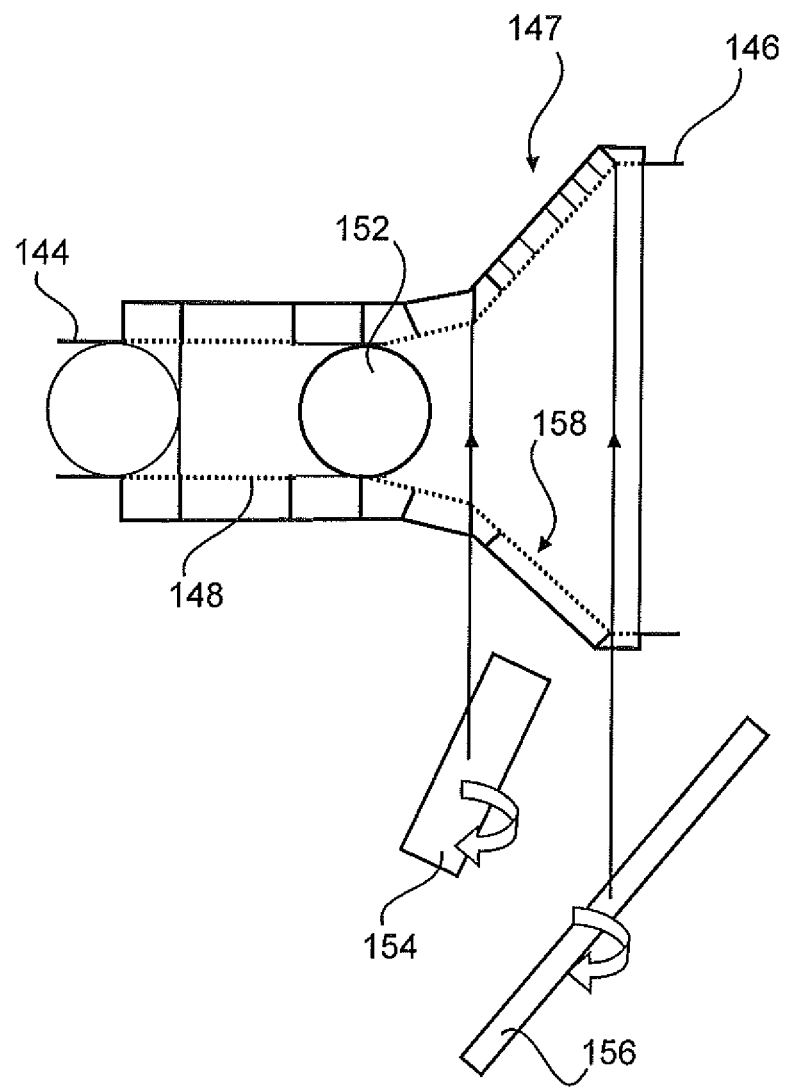
FIG. 10 shows another exemplary embodiment of the silencer according to the invention.

The cross section of the flow channel 148 in the region of the first shape 152 is exemplarily illustrated in the form of a circular cross section while the flow channel 148 is exemplarily illustrated with a rectangular shape in the region of the second shape 154 and the third shape 156. For example, the flow channel 148 forms straight wall surfaces 158 between the second shape 154 and the third shape 156. FIG. 10 shows the exemplary embodiment according to FIG. 9, in which the main axes of the second shape 154 and the third shape 156 are turned relative to the first shape 152. The main axes can be turned in such a way that the outlet points downward, upward or sideward.

Figure 11:
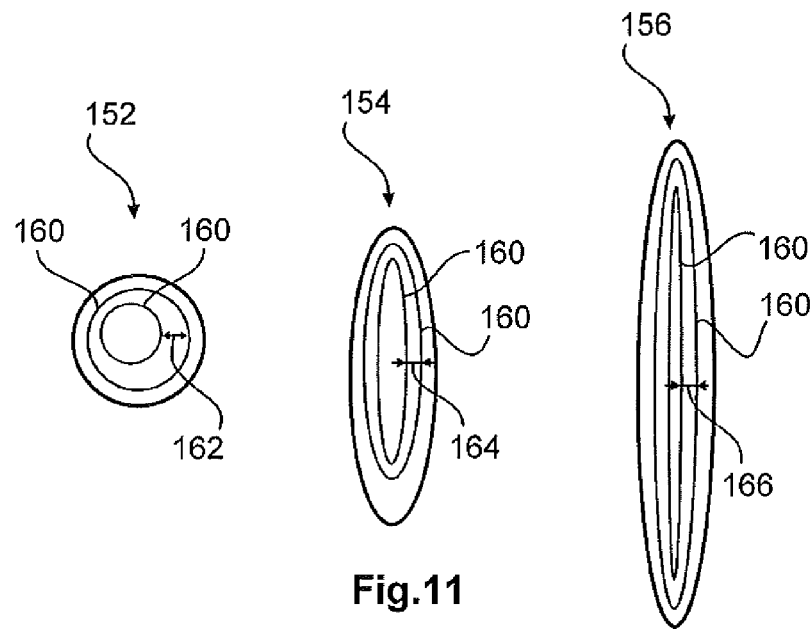
FIG. 11 shows the deformation of radial modes in an elongated component on the end of an silencer according to the invention.

FIG. 11 shows deformed radial modes that respectively occur in a region of a first shape 152, a second shape 154 and a third shape 156. This figure clearly shows several nodal lines 160, the distances 162, 164 and 166 of which from one another become smaller as the corresponding sound wave approaches the end of a silencer designed in accordance with FIGS. 8a to 10.

In the region of the first shape 152, the distance 162 between the nodal lines 160 is relatively large while the distance 166 between the nodal lines 160 in the third shape 156 could approximately correspond to half the distance 162 in the region of the first shape 152. This distance 166 could concretely be smaller than half a wavelength such that the propagation of the sound waves in this rear region of the silencer is reduced or entirely prevented. The centers of the noise fields lie closer to the absorbing wall of the respective housing 134 or 150.

Figure 12A:
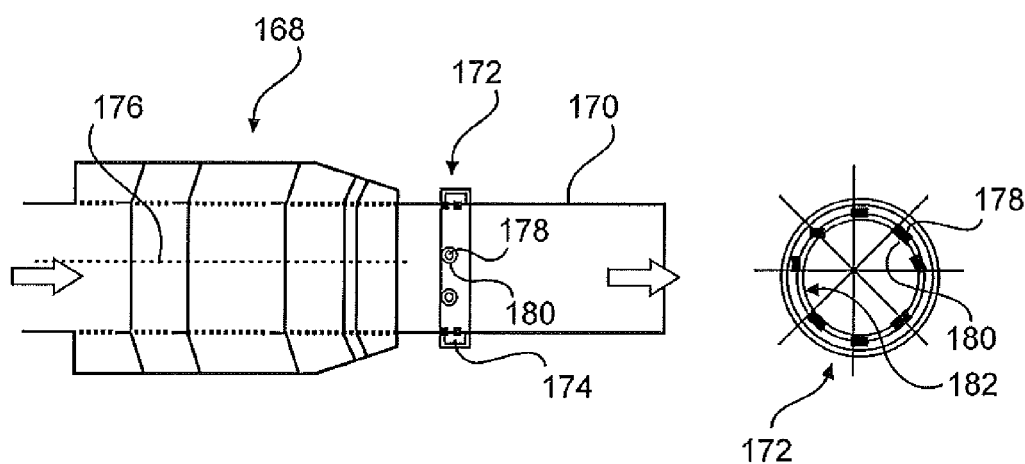
FIG. 12 shows an exemplary silencer with an exemplary annular channel.

FIG. 12a shows an additional improvement of a silencer according to the invention. An exemplarily illustrated silencer 168, the shape and internal structure of which are completely irrelevant with respect to the additional improvement of the silencer to be described with reference to the following figures, comprises an elongated outlet 170, on which an annular channel 172 is arranged. The annular channel 172 could be created, for example, by the rotation of an arbitrarily shaped area that forms the normal cross section 174 about a longitudinal axis 176 of the silencer 168.

Figure 12B:
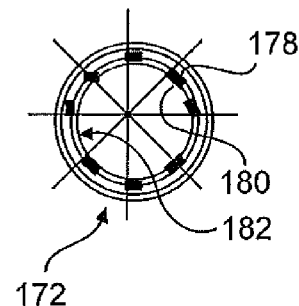

According to FIG. 12b, the annular channel 172 comprises several openings 178 that correspond to suitable openings 180 of the outlet 170. For reasons of simplicity, overlapping openings 178 and 180 of the outlet 170 are respectively illustrated in FIG. 12b. In the following description, the design of the openings 178 and 180 is irrelevant and it merely needs to be ensured that a connection between the outlet 170 and the annular channel 172 can be produced.

For example, the openings 178 and 180 are uniformly distributed over an inner circumference 182 of the annular channel 172. In this context, it should be ensured that the phase and the opposite phase of a natural vibration of a first radial mode respectively alternate in two adjacent openings 178 of the annular channel 117. Alternatively, it would also be possible to realize other patterns of phases and opposite phases, in which the corresponding openings 178 do not necessarily have to be arranged directly adjacent. Accordingly, it is considered advantageous to arrange an even number of openings 178 on the annular channel 172.

In this case, the area of the normal cross section 174 of the annular channel 72 is designed such that a vibration propagates in a region between two adjacent openings 178 in the annular channel 172 in such a way that the vibration from the annular channel 172 that encounters the adjacent opening 178 or the other corresponding opening 178 leads by half an oscillation period and a phase therefore encounters an opposite phase at each opening in order to largely cancel out the vibration phenomena.

Figure 12C:
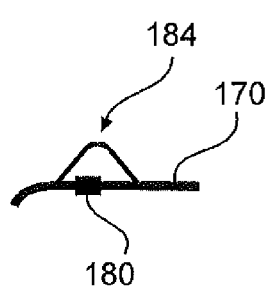

According to FIGS. 12c, d and e, the cross-sectional shape of the annular channel 172 is basically irrelevant. FIG. 12c shows an annular channel 184 that has an approximately triangular cross section, wherein the cross section could also be opened on a side that protrudes toward the outlet 170. Accordingly, no separate opening 178 is required in the annular channel 184 because the opening 180 in the outlet 170 suffices for communicating with the annular channel 184.

Figure 12D:
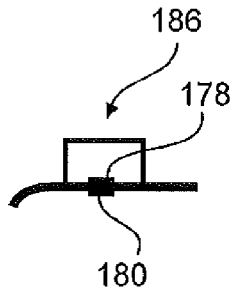

FIG. 12d shows an annular channel 186 that has a closed rectangular cross section.

Figure 12E:
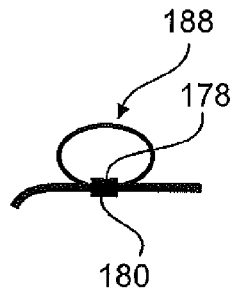

Furthermore, FIG. 12e shows an oval or elliptical annular channel 188, wherein many more different cross-sectional shapes could also be realized, and wherein the illustrated cross-sectional shapes should not be used for restricting the invention.

Figure 13:
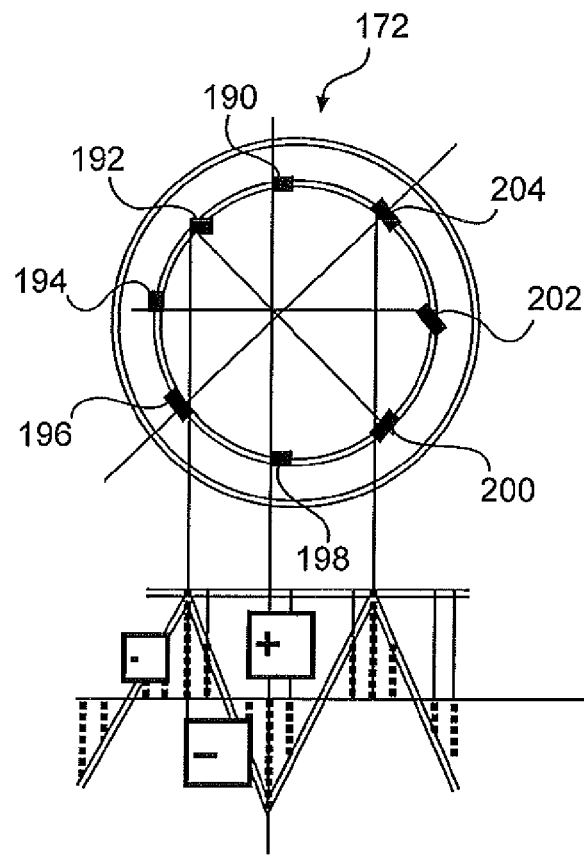
FIG. 13 schematically shows phases and opposite phases in an annular channel on the outlet of an arbitrary silencer according to the invention.

The distribution of the pressure in the first radial mode is illustrated in FIG. 13. At resonance, the pressure waves are in phase in all points 190 to 204. A vibration is incited within the annular channel 172 by the exemplarily discussed opening 190 of the annular channel 172 and reaches the adjacent point 192 with a phase that depends on the distance between the openings 190 and 192. The incited vibration once again reaches the outlet 170 through the opening 192. The distance between the openings 190 and 192 is calculated in accordance with the following formula that is based on 8 openings 190-204:

$$L_{190-192} = \pi \cdot \frac{D}{8}$$

wherein D is the diameter of the outlet 170.

The phase shift therefore is calculated in accordance with $$Fi_{190-192} = \frac{2\pi \cdot F_{1R} \cdot L_{190-192}}{c}$$

wherein $F_{1R}$ is the critical frequency and c is the speed of sound. The critical frequency is calculated in the form of $$F_{1R} = \frac{1,22 \cdot c}{D}$$

such that the phase shift is calculated in accordance with $$Fi_{190-192} = \frac{2,44\pi^2}{8} = 3,01 \text{ rad} \approx \pi$$

This means that the vibration from the annular channel 172 reaches the outlet 170 from the opening 192 with an approximately opposite phase, i.e., $Fi_{190-192}$ approximately $\pi$, and therefore cancels out the vibration of the radial mode.

A similar interference is also achieved for the noise from other openings 204, 202 and the like and the radial mode is dampened within the outlet 170 in this fashion.

Accordingly, a total of 8 openings 178 or 180 is considered particularly advantageous for the additional improvement of a silencer according to the invention illustrated in FIGS. 12a to 13.

Figure 14:
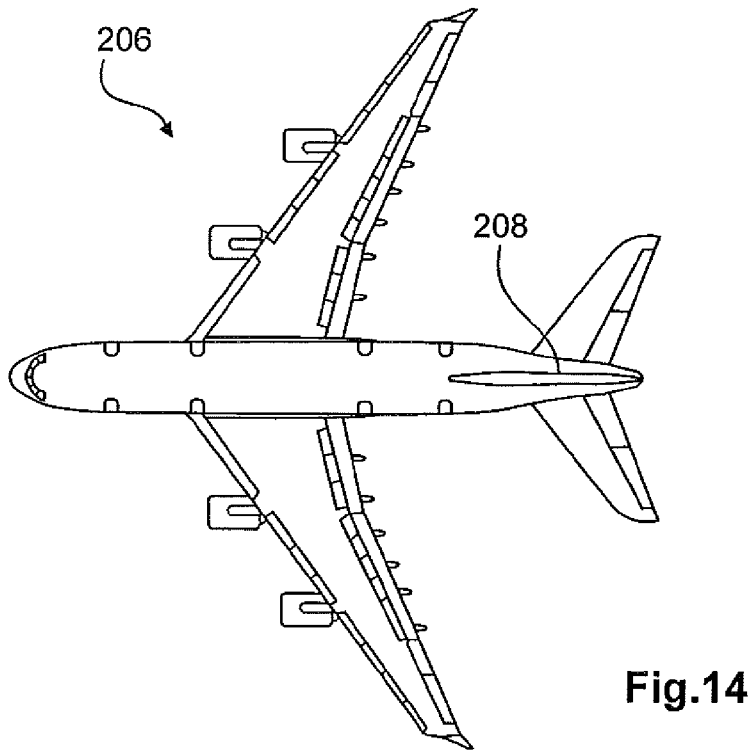
FIG. 14 shows an aircraft with at least one auxiliary power unit and at least one silencer according to the invention.

FIG. 14 ultimately shows an aircraft 206 with an auxiliary power unit 208 that is equipped with a silencer according to the invention. The basic shape and the internal structure of a silencer according to the invention according to one of the above-described exemplary embodiments make it possible to realize a particularly compact shape that still provides very good sound insulation properties. Due to the special shape of the rear end of the silencer in the form of a fishtail, it can be adapted particularly well to a tail section of an aircraft. An additional improvement of the sound insulation properties is achieved by arranging an annular channel on an elongated outlet of an arbitrarily designed silencer.

In contrast to the above-described exemplary embodiments, the silencer according to the invention could also be realized in the form of the following examples:

EXAMPLE 1

A silencer for an auxiliary power unit of an aircraft comprises an inlet, an outlet, a housing and a flow channel that is arranged in the housing, wherein an intermediate space formed between the housing and the flow channel is divided into outer cells arranged around the flow channel by means of one or more partitions and the wall material of the flow channel is porous, wherein the partitions are arranged relative to one another in such a way that at least two outer cells with a respective length that corresponds to 0.2-0.6-times the hydraulic diameter of the flow channel and a respective height that corresponds to 0.3-0.45-times the hydraulic diameter of the flow channel are formed in the intermediate space between the housing and the flow channel in a cylindrical section of the housing, wherein at least one outer cell is divided into an outer region and an inner region by means of a porous absorber layer in the cylindrical section of the housing, and wherein the outer region does not directly communicate with the flow channel.

EXAMPLE 2

A silencer of example 1, in which the housing has a conical shape at least in one section.

EXAMPLE 3

A silencer of example 1 or 2, in which the sum of the volumes of all outer regions of at least one outer cell in the cylindrical section of the housing corresponds to 0.8-1.2-times the sum of the volumes of all inner regions of the same outer cell.

EXAMPLE 4

A silencer of example 1, in which the partitions are arranged relative to one another in the cylindrical section of the housing such that at least two groups of outer cells are formed in the intermediate space between the cylindrical section of the housing and the flow channel, wherein outer cells of a first group respectively have a length comprised of a first interval and outer cells of a second group respectively have a length comprised of a second interval, and wherein the first and the second interval are adjacent to one another and respectively have a width that essentially corresponds to 0.1-times the hydraulic diameter of the flow channel.

EXAMPLE 5

A silencer of example 4, in which the first group of outer cells has a length that corresponds to 0.3-0.4-times the hydraulic diameter of the flow channel.

EXAMPLE 6

A silencer of example 4 or 5, in which the second group of outer cells has a length that corresponds to 0.4-0.5-times the hydraulic diameter of the flow channel.

EXAMPLE 7

A silencer of one of examples 4 to 6, in which an additional third group of outer cells has a length that corresponds to 0.2-0.3-times the hydraulic diameter of the flow channel.

EXAMPLE 8

A silencer of one of the preceding examples, in which the wall material of the flow channel has a flow resistance that corresponds to 0.8- to 1.2-times a basic resistance that is calculated in accordance with $$R = 410 \cdot \left(\frac{293}{T}\right)^{1.26} \frac{Pa}{\frac{m}{s}}$$

wherein T is the temperature of the gas flowing through the silencer expressed in Kelvin (K).

EXAMPLE 9

A silencer of one of the preceding examples, in which at least one partition respectively comprises at least one drainage hole.

EXAMPLE 10

A silencer of one of the preceding examples, in which the porous absorber layer in the cylindrical section of the housing is realized in such a way that the outer regions of the outer cells helically extend around the inner regions of the outer cells.

EXAMPLE 11

A silencer of one of the preceding examples, in which the porous absorber layer in the cylindrical section of the housing is realized in such a way that the outer regions of the outer cells annularly extend around or adjacent to the inner regions of the outer cells.

In addition, silencers realized in accordance with any design known from the state of the art can also be equipped with an elongated outlet and an additional annular channel in order to achieve improved sound dampening.

As a supplement, it should be noted that "comprising" does not exclude any other elements or steps, and that "a" or "an" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

List of Reference Symbols
2 Silencer
3 Cylindrical housing component
4 Housing
5 Conical housing component
6 Flow channel
8 Partition
10 Outer cell
12 Outer cell
14 Outer cell
16 Outer cell
18 Outer cell
20 Outer cell
22 Outer cell
24 Outer cell
26 Outer cell
28 Inner cell
30 Inner cell
32 Inner cell
34 Inner cell
36 Inner cell
38 Inner cell
40 Inner cell
42 Inner cell
44 Inner cell
46 Inlet
48 Outlet
49 Drainage hole
50 Cell
52 Inner cell
54 Outer cell
56 First interval of a first group
58 Second interval of a second group
60 Third interval of a third group
62 Silencer
64 Housing
66 Flow channel
68 Inlet
70 Outlet
72 Partition
74 Inner cell
76 Outer cell
78 Porous absorber layer
80 Outer region
82 Inner region
84 Outer cell
85 Outer cell
86 Length of outer cell
87 Outer cell
88 Hydraulic diameter
90 Height of outer cell
92 Region with cylindrical shape
94 Region with conical shape
96 Drainage hole
98 Porous absorber layer
100 Outer cell
102 Inner region
104 Outer region
106 Porous absorber layer
108 Outer region
110 Porous absorber layer 112 Outer region
114 Inner region
116 Porous absorber layer
118 Outer region
120 Inner region
122 Porous absorber layer
124 Inner region
126 Outer region
128 Silencer
130 Inlet
132 Outlet
134 Housing
135 Elongated component
136 Flow channel
138 First shape
140 Second shape
142 Silencer
144 Inlet
146 Outlet
147 Elongated component
148 Flow channel
150 Housing
152 First shape
154 Second shape
156 Third shape
158 Section
160 Nodal line
162 Distance
164 Distance
166 Distance
168 Silencer
170 Outlet
172 Annular channel
174 Normal cross section
176 Longitudinal axis
178 Opening
180 Opening
182 Inner circumference
184 Annular channel
186 Annular channel
188 Annular channel
190 Opening
192 Opening
194 Opening
196 Opening
198 Opening
200 Opening
202 Opening
204 Opening
206 Aircraft
208 APU

The invention claimed is:

1. A silencer for an auxiliary power unit of an aircraft, comprising:
 an inlet;
 an outlet;
 a housing; and
 a flow channel arranged in the housing,
 wherein an intermediate space is formed between the housing and the flow channel, the intermediate space being divided into outer cells that are arranged around the flow channel by one or more partitions, wherein a wall material of the flow channel is porous,
 wherein the partitions are arranged relative to one another in such a way that at least first and second groups of outer cells are formed in the intermediate space between the housing and the flow channel,
 wherein the outer cells of the first group have a length comprised of a first interval and the outer cells of the second group have a length comprised of a second interval,
 wherein the first and the second intervals are adjacent to one another and respectively have a width essentially corresponding to 0.1-times the hydraulic diameter of the flow channel, and
 wherein the outer cells have a volume corresponding to 1.0-1.2-times the volume of inner cells enclosed by the respective outer cells and formed in the flow channel.

2. The silencer of claim 1,
 wherein the partitions are arranged relative to one another in such a way that at least two outer cells with a respective length corresponding to 0.2-0.6-times the hydraulic diameter of the flow channel and a respective height corresponding to 0.3-0.45-times the hydraulic diameter of the flow channel are formed in the intermediate space between the housing and the flow channel in a cylindrical section of the housing, and
 wherein at least one outer cell is divided into an outer region and an inner region by a porous absorber layer in the cylindrical section of the housing, wherein the outer region is not in direct communication with the flow channel.

3. The silencer of claim 2, wherein the porous absorber layer in the cylindrical section of the housing is realized in such a way that the outer regions of the outer cells helically extend around the inner regions of the outer cells.

4. The silencer of claim 2, wherein the porous absorber layer in the cylindrical section of the housing is realized in such a way that the outer regions of the outer cells annularly extend around or adjacent to the inner regions of the outer cells.

5. The silencer of claim 2, wherein the sum of the volumes of all outer regions of at least one outer cell in the cylindrical section of the housing corresponds to 0.8-1.2-times the sum of the volumes of all inner regions of the same outer cell.

6. The silencer of claim 2, wherein the partitions are arranged relative to one another in the cylindrical section of the housing in such a way that at least two groups of outer cells are formed in the intermediate space between the cylindrical section of the housing and the flow channel, wherein the outer cells of a first group respectively have a length comprised of a first interval and the outer cells of a second group respectively have a length comprised of a second interval, and wherein the first and the second intervals are adjacent to one another and respectively have a width that substantially corresponds to 0.1-times the hydraulic diameter of the flow channel.

7. The silencer of claim 1, wherein the first group of outer cells has a length corresponding to 0.3-0.4-times the hydraulic diameter of the flow channel.

8. The silencer of claim 1, wherein the second group of outer cells has a length corresponding to 0.4-0.5-times the hydraulic diameter of the flow channel.

9. The silencer of claim 1, wherein an additional third group of outer cells has a length corresponding to 0.2-0.3-times the hydraulic diameter of the flow channel.

10. The silencer of claim 1, wherein the wall material of the flow channel has a flow resistance corresponding to 0.8- to 1.2-times a basic resistance that is calculated in accordance with $$R = 410 \cdot \left(\frac{293}{T}\right)^{1.26} \frac{\text{Pa}}{\frac{\text{m}}{\text{s}}}$$

wherein T is the temperature of the gas flowing through the silencer expressed in Kelvin.

11. The silencer of claim 1, wherein at least one partition respectively comprises at least one drainage hole.

12. The silencer of claim 1, wherein the housing comprises one or more conical components.

13. The silencer of claim 1, wherein the cross section of the flow channel and of at least one section of the housing surrounding the flow channel continuously changes from a first shape to a second shape, wherein each point in the first cross-sectional shape of the flow channel is spaced apart from a nearest outer contour point of the housing by a distance corresponding to no more than half the hydraulic diameter of the first shape, and wherein each point in the second cross-sectional shape of the flow channel is spaced apart from a nearest outer contour point of the housing by a distance corresponding to no more than one-fourth the hydraulic diameter of the first shape.

14. The silencer of claim 1, further comprising an annular channel placed on an elongated outlet and communicating with the outlet via at least one opening arranged on the outlet.

15. The silencer of claim 14, further comprising a plurality of openings arranged on an inner circumference of the annular channel in such a way that a sound wave entering the annular channel through an opening propagates and reaches an adjacent opening, and wherein the sound wave entering the annular channel from the outlet via the adjacent opening has an opposite phase referred to the sound wave propagating in the annular channel and the phase and the opposite phase cancel one another out at the adjacent opening.

16. The silencer of claim 14, wherein the annular channel communicates with the outlet via a plurality of openings uniformly distributed over the outlet.

17. The silencer of claim 1, wherein the flow channel is dimensioned such that radial velocity components of at least first and second transversal modes created in the silencer have a common maximum in the region of the wall of the flow channel.

18. The silencer of claim 17, further comprising additional outer cells in order to dampen high-frequency noises, and wherein the additional outer cells have a volume that corresponds to 0.75-0.85-times the volume of inner cells that are enclosed by the respective outer cells and formed in the flow channel.

19. A method for making a silencer for an auxiliary power unit of an aircraft, the method comprising:
providing a silencer with an inlet, an outlet, a housing and a flow channel having a porous wall material;
forming an intermediate space between the housing and the flow channel;
dividing the intermediate space into outer cells arranged around the flow channel by one or more partitions; and
arranging the partitions relative to one another in such a way that at least first and second groups of outer cells are formed in the intermediate space between the housing and the flow channel,
wherein the first and the second intervals are adjacent to one another and respectively have a width essentially corresponding to 0.1-times the hydraulic diameter of the flow channel, and
wherein the outer cells have a volume corresponding to 1.0-1.2-times the volume of inner cells enclosed by the respective outer cells and formed in the flow channel.

* * * * *